(12) United States Patent
Carberry et al.

(10) Patent No.: US 9,040,160 B2
(45) Date of Patent: May 26, 2015

(54) MULTILAYER ARMOR

(75) Inventors: John Carberry, Talbot, TN (US);
Katherine T. Leighton, Media, PA (US); Carsten Weinhold, Scranton, PA (US); Eric Urruti, Duryea, PA (US)

(73) Assignee: Schott Corporation, Elmsford, NY (US)

( * ) Notice: Subject to any disclaimer, the term of this patent is extended or adjusted under 35 U.S.C. 154(b) by 568 days.

(21) Appl. No.: 13/441,413

(22) Filed: Apr. 6, 2012

(65) Prior Publication Data
US 2012/0297964 A1  Nov. 29, 2012

Related U.S. Application Data

(60) Provisional application No. 61/473,559, filed on Apr. 8, 2011.

(51) Int. Cl.
*B32B 17/06* (2006.01)
*F41H 5/04* (2006.01)

(52) U.S. Cl.
CPC ............ *F41H 5/0407* (2013.01); *F41H 5/0414* (2013.01)

(58) Field of Classification Search
USPC ......... 428/426, 428, 432, 688, 689, 699, 410, 428/212
See application file for complete search history.

(56) References Cited

U.S. PATENT DOCUMENTS

| | | | |
|---|---|---|---|
| 3,535,098 A | 10/1970 | Babcock | |
| 4,774,143 A * | 9/1988 | Gondela et al. | 428/442 |
| 7,077,048 B1 | 7/2006 | Anderson, Jr. et al. | |
| 7,562,612 B2 | 7/2009 | Lucuta et al. | |
| 7,603,393 B1 | 10/2009 | Cote et al. | |
| 7,736,474 B2 | 6/2010 | Kurashina et al. | |
| 7,827,897 B2 * | 11/2010 | Magnusson et al. | 89/36.02 |
| 7,908,973 B2 | 3/2011 | De Lair et al. | |
| 2008/0006146 A1 * | 1/2008 | Magnusson et al. | 89/36.02 |
| 2009/0136702 A1 * | 5/2009 | Gu | 428/49 |
| 2009/0217813 A1 * | 9/2009 | Carberry et al. | 89/36.02 |
| 2009/0320675 A1 * | 12/2009 | Landingham et al. | 89/36.02 |
| 2009/0324935 A1 * | 12/2009 | Bennison et al. | 428/334 |
| 2009/0324966 A1 | 12/2009 | Benitsch et al. | |
| 2010/0031810 A1 * | 2/2010 | Neal | 89/36.02 |

FOREIGN PATENT DOCUMENTS

WO    0192810    12/2001

OTHER PUBLICATIONS

U.S. Appl. No. 61/473,559, filed Apr. 8, 2011, Carberry et al.
Dwivedi et al.; "Two Dimensional Mesoscale Simulations of Projectile Instability During Penetration in Dry Sand"; Journal of Applied Physics; Oct. 20, 2008; pp. 1-10.

(Continued)

*Primary Examiner* — David Sample
*Assistant Examiner* — Lauren Colgan
(74) *Attorney, Agent, or Firm* — Ohlandt, Greeley, Ruggiero & Perle, LLP

(57) ABSTRACT

A multilayer armor is provided that includes a first rigid layer, a second rigid layer, and an interlayer securing the first and second rigid layers to one another. At least one of the first and second rigid layers can include a plurality of regions with a physical or material property that varies between the regions. The interlayer can have a force-extension ratio of 5,600 psi/in or less. The interlayer can have a physical or material property that varies within the interlayer.

11 Claims, 20 Drawing Sheets

(56) References Cited

OTHER PUBLICATIONS

Todd P. Broyles; Sandia Report—"An Evaluation of the PENCURV Model for Penetration Events in Complex Targets"; Sandia National Laboratories; Jul. 2004; pp. 1-40.

International Search Report dated Nov. 29, 2012 for PCT application No. PCT/US2012/032541.
Written Opinion dated Nov. 29, 2012 for PCT application No. PCT/US2012/032541.
International Preliminary Report on Patentablity (IPRP) dated Oct. 8, 2013 for PCT application No. PCT/US2012/032541.

\* cited by examiner

MULTILAYER ARMOR

CROSS REFERENCE TO RELATED APPLICATIONS

This application claims the benefit of U.S. Provisional Application Ser. No. 61/473,559, filed on Apr. 8, 2011, the entire contents of which are incorporated by reference herein.

BACKGROUND OF THE INVENTION

1. Field of the Invention

The present disclosure is related to armor. More particularly, the present disclosure is related to multilayer armor made of materials such as glass, glass-ceramic, or plastics, with improved multi-hit capabilities.

2. Description of Related Art

Ballistic rounds tend to have a high aspect ratio, where the length of the round is several times longer than the diameter of the round, and where the round itself is constructed of hardened steel or tungsten carbide or the like.

It is well known to those accomplished in the art of designing, developing, manufacturing, testing ballistic armor that the armor makes a stronger and more secure defeat of the incoming round if that round is caused to "turn" once it impacts and starts to penetrate the armor.

The key reason a turning projectile is considered so favorable to defeating the incoming projectile is that as soon as the projectile is turned it is facing a far thicker cross section of armor as the angle created by the turning significantly increases the distance to the back face. Stated another way, the aspect ratio of the projectile is not just very large, where the area of the pointed tip has a dramatically smaller surface area than the surface area of the side of the projectile. Thus, turning the projectile refers to changing its angle of incidence with respect to the armor so that more of the larger aspect ratio sides impact the target than the smaller aspect ratio tip.

Turning is also thought to significantly reduce the velocity and energy of the projectile since the area of the projectile interacting with the armor translates from the cross section described by the z axis to one described by it length and part of its diameter.

Additionally, the turning of incoming projectiles also changes the profile of energy and kinetic transfer from the tip of the projectile to the armor to the cross section described by the surface area of the side of the projectile to the armor. In addition, it imparts torque loads that can bend or break the round.

In many cases the prior art armor, especially in the case of opaque armor, has focused on construction and geometries designed to cause the turning of the incoming round. In other prior art armor, ceramic shapes such as pyramids, balls and the like have been assembled into the strike face or body of such armor to assure the turning of the round such as the structures seen in U.S. Pat. Nos. 7,603,939, 7,736,474, 7,077,048, and 7,562,612.

In still other prior art armor, granular media has been used to influence the turning of projectiles, where the turning is effected by the features of the granules such as size, density, packing, depth, etc. and their ability to impose lateral displacement and angular momentum such as the structures seen in U.S. Pat. No. 7,827,897, International Publication No. WO0192810, the article by S. K. Dwividi et al., "Two dimensional mesoscale simulations of projectile penetration into dry sand," J. Appl. Phys. 104 (2008), and the article by Todd P. Broyles, "An Evaluation of the PENCURV Model for Penetration Events in Complex Targets," Sandia report, SAND2004-3482.

Still further, prior art armor has used the inclusion of gaps or spaces within the armor to encourage turning of projectiles as seen in U.S. Publication No. 20090217813 and U.S. Pat. No. 7,908,973.

Unfortunately, many of these prior art techniques for turning the projectile cannot be applied to transparent armor as the transparency will be diminished or eliminated by the structures describe by much of this prior art.

Therefore, it has been determined by the present disclosure that armor, particularly transparent glass-ceramic armor, that enhances the turning of incoming round, particularly second rounds, is a valuable way to make more reliable and robust armor, and also a way to make the armor less weighty.

BRIEF SUMMARY OF THE INVENTION

Armor is provided that addresses multiple hits of ballistic rounds, which tend to have a high aspect ratio, where the length of the round is several times longer than the diameter of the round, and where the round itself is constructed of hardened steel or tungsten carbide or the like.

The armor of the present disclosure is configured to promote the turning of both initial and subsequent rounds or projectiles through the use of rigid layers and/or adhesive interlayers that have varied physical or material properties within that layer or interlayer.

The armor of the present disclosure provides rigid layers and/or interlayers having non-homogeneous regions or areas therein that interact with an incoming projectile causing it to turn and thereby take less thickness and weight to defeat the projectile.

The armor of the present disclosure provides rigid layers laminated by interlayers having a force to extension ratio of 5,600 pounds per inch per inch (psi/in) or less, and preferably 2,800 psi/in at the operational temperature of the armor, which loosely binds together fragments of the rigid layers impacted by a first projectile in a manner that promotes turning of subsequent projectiles.

A multilayer armor is provided that includes a first rigid layer, a second rigid layer, and an interlayer securing the first and second rigid layers to one another. In some embodiments, at least one of the first and second rigid layers can includes a plurality of regions with a physical or material property that varies between the regions. In other embodiments, the interlayer can have a force-extension ratio of 5,600 psi/in or less. Further, the interlayer can have a physical or material property that varies within the interlayer.

The armor of the present disclosure provides rigid layers where the rigid layers are glass or glass-ceramic laminated by interlayers, where the strike face has a strength that is at least three times and, preferably five times, greater than a strength of the subsequent layers.

DETAILED DESCRIPTION OF THE INVENTION

The armor of the present disclosure relates to both opaque armor, typically used in body armor, helicopter armor, vehicle armor and the like, and transparent armor, typically used in lights and windows in vehicles, buildings, and other applications.

As used herein, the term "complete penetration" shall mean that the incoming rounds completely penetrate the armor such that spall, armor, the round itself, or pieces of the round exit the "safe" side of the armor. The term "partial penetration" shall mean that the incoming rounds inflict damage to the armor including damage to the strike face up to and including deformation of the back plates at the "safe side" of the armor.

Figure 1:
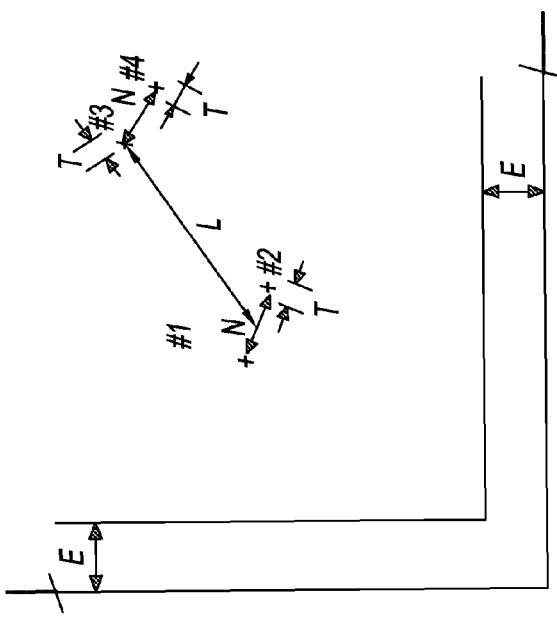
FIGS. 1 through 3 illustrate exemplary multi-hit ballistic testing patterns.
Figure 2:
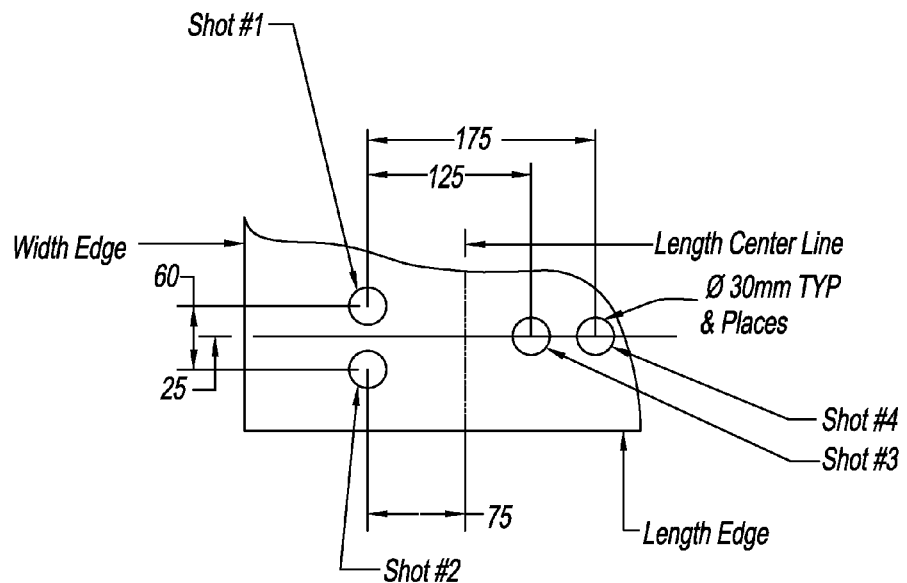
Figure 3:
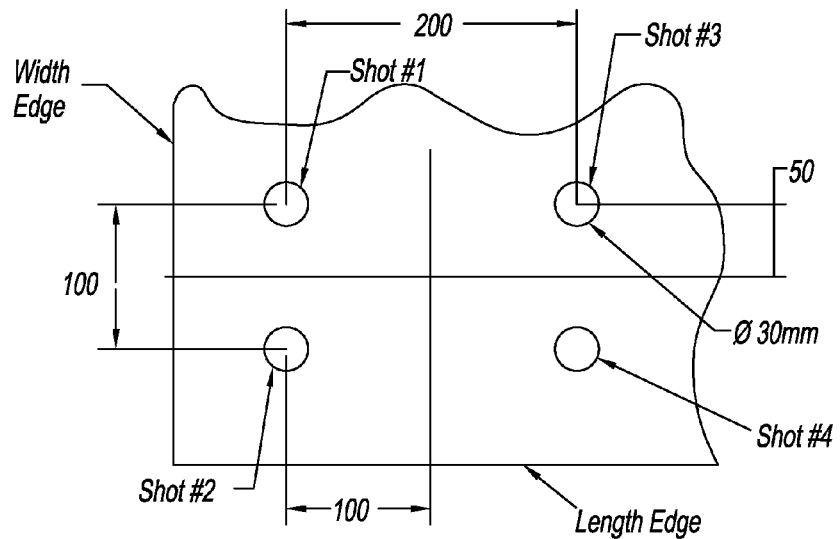
Figure 4:
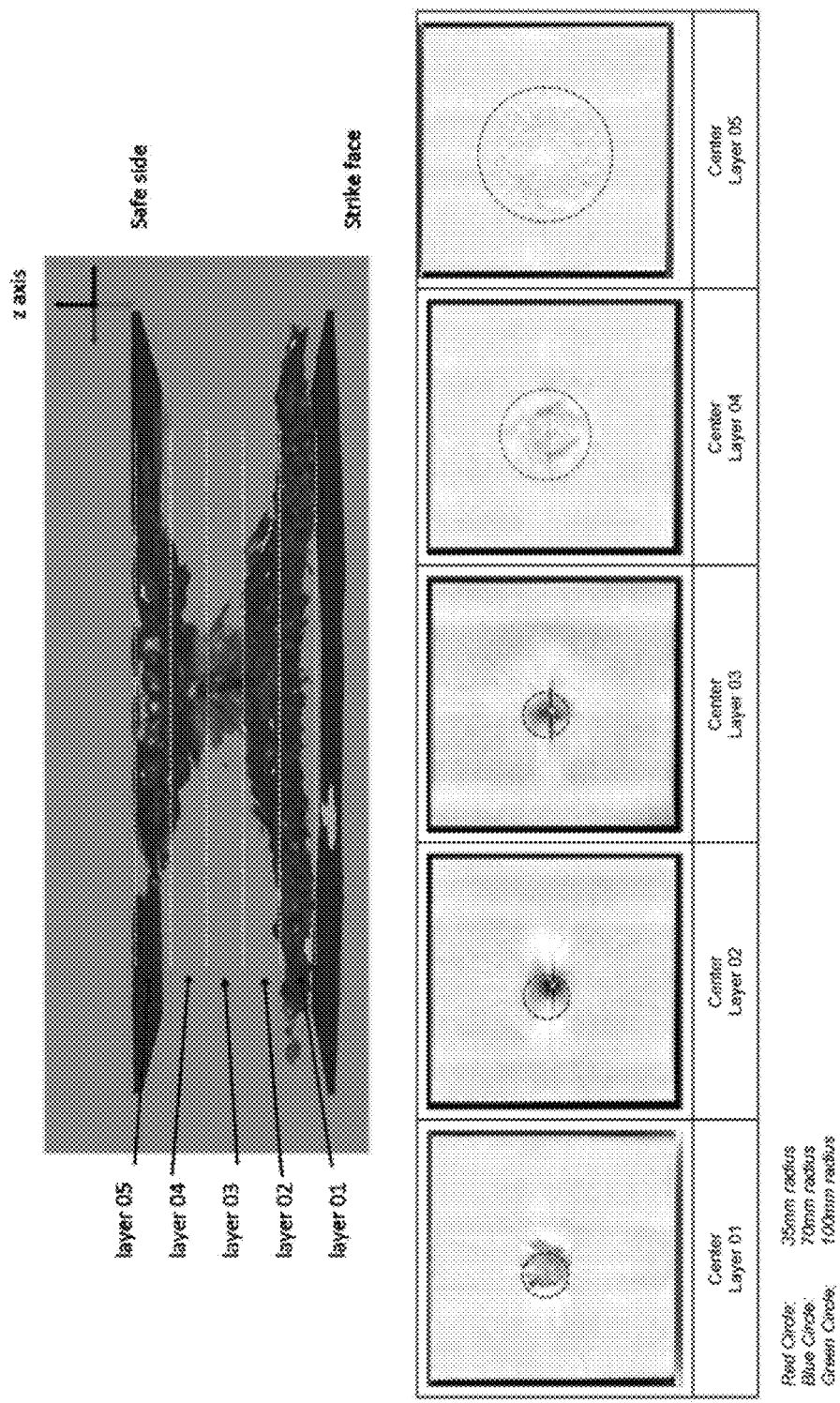
FIGS. 4 through 18 are x-ray tomography pictures illustrating damage patterns to glass-ceramic armor targets according to the present disclosure from impacts with armor piercing projectiles.
Figure 5:
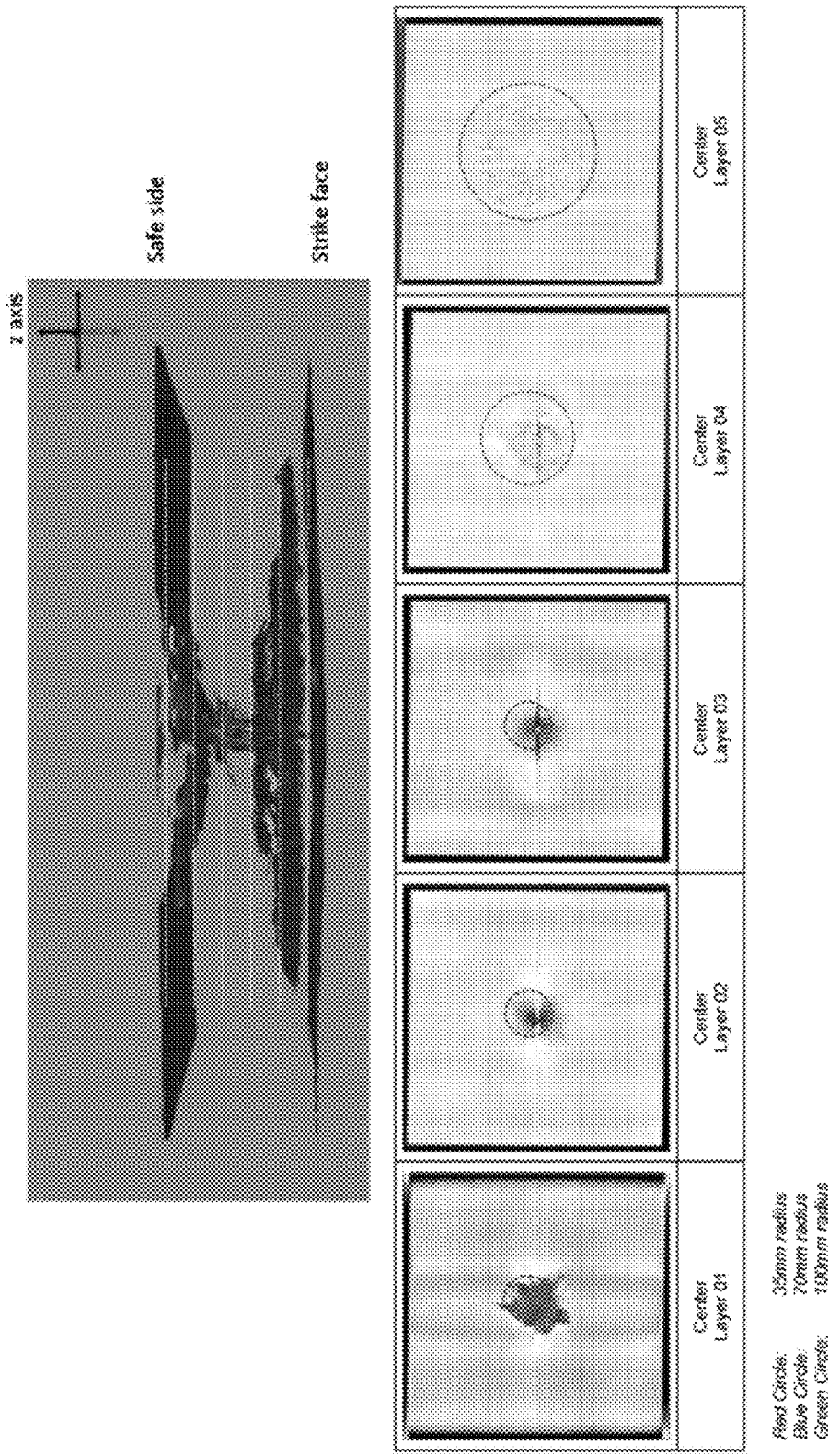
Figure 6:
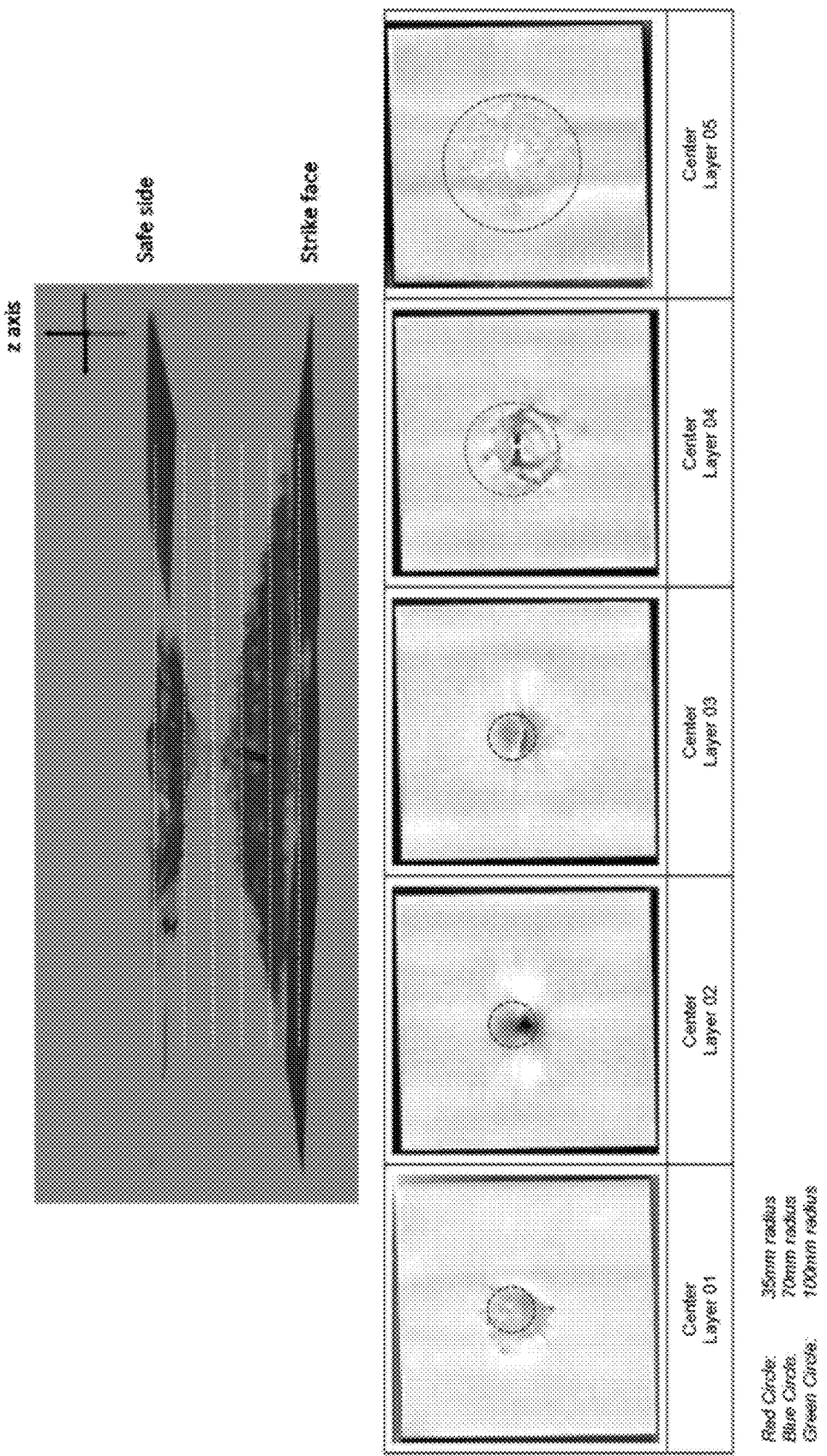
Figure 7:
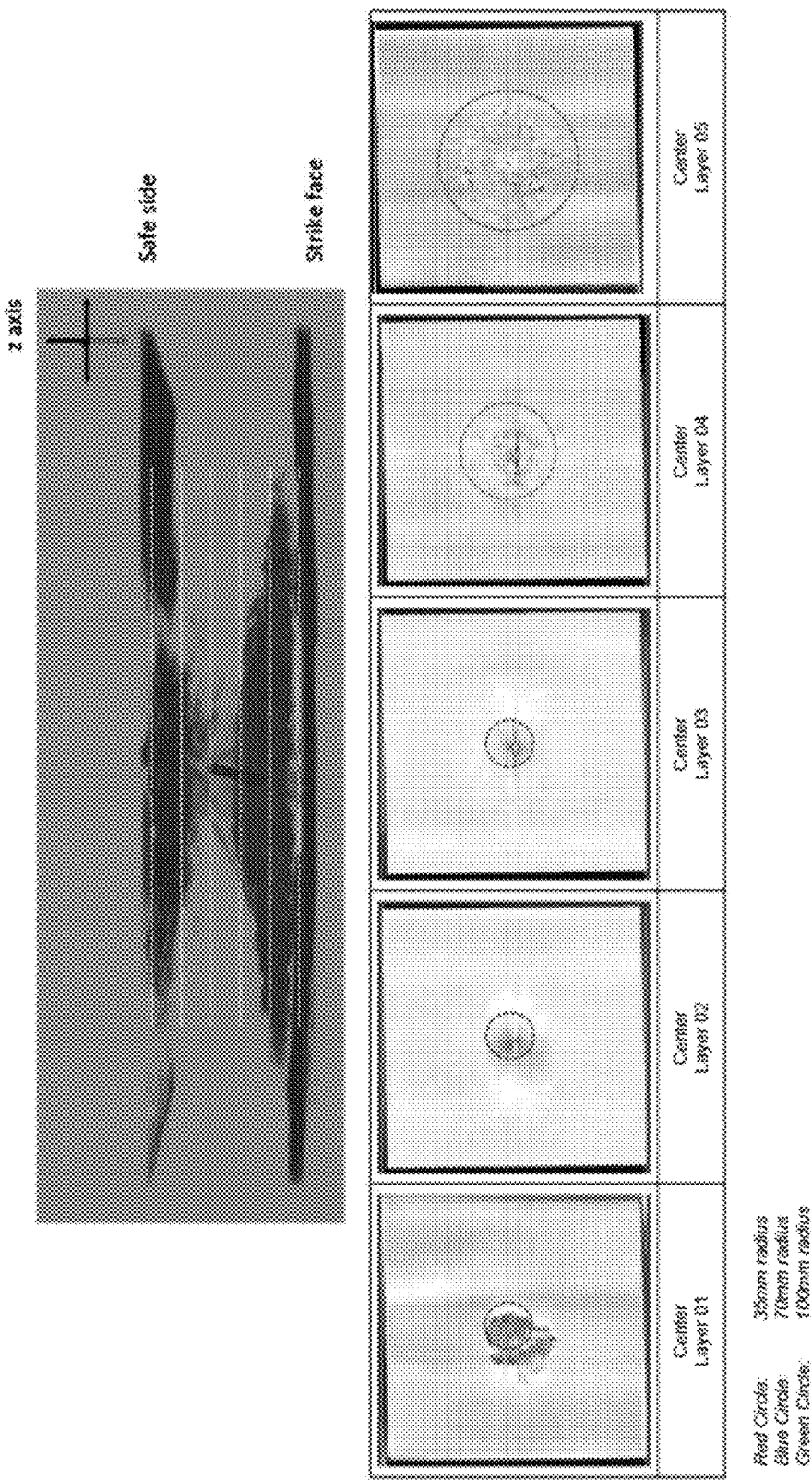
Figure 8:
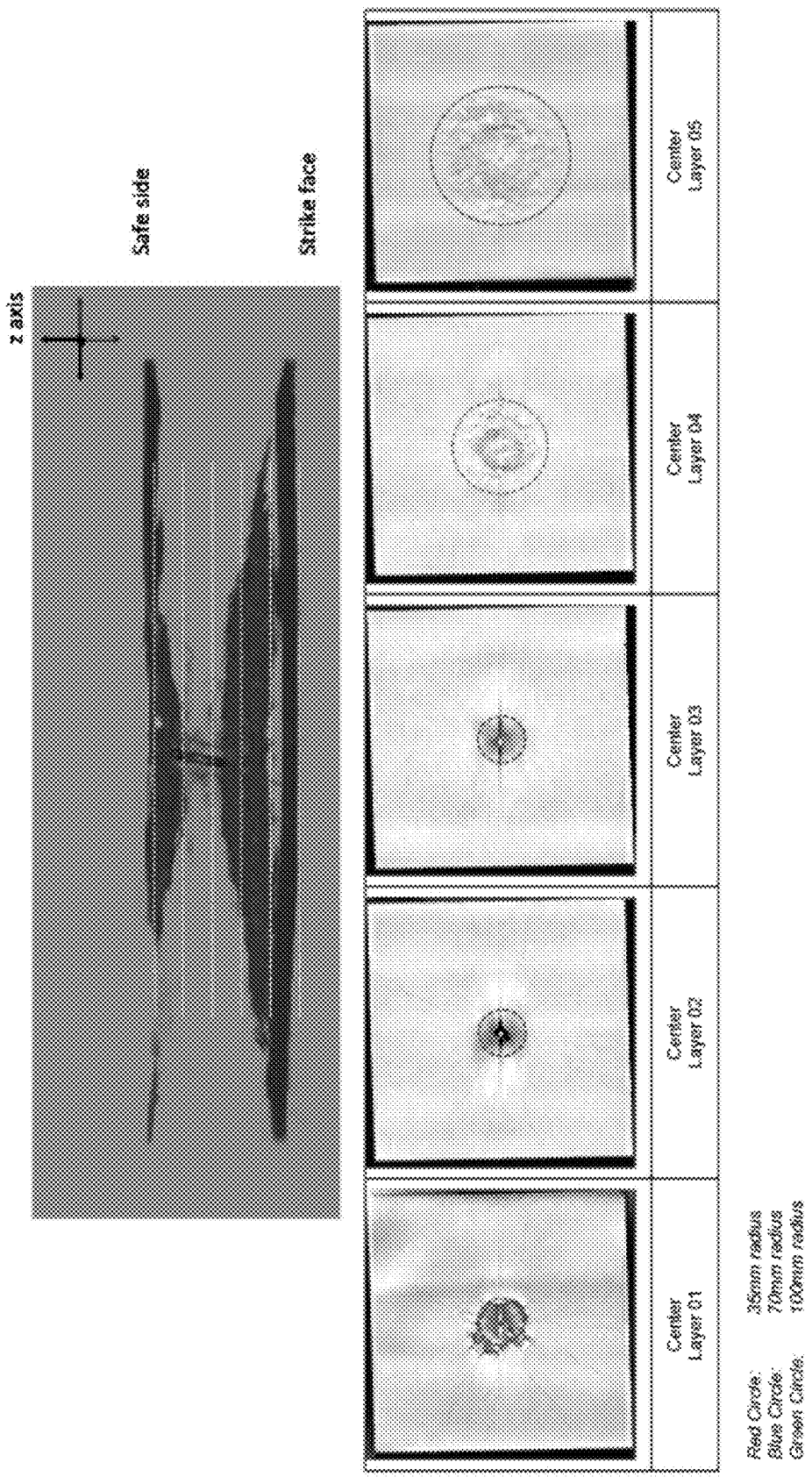
Figure 9:
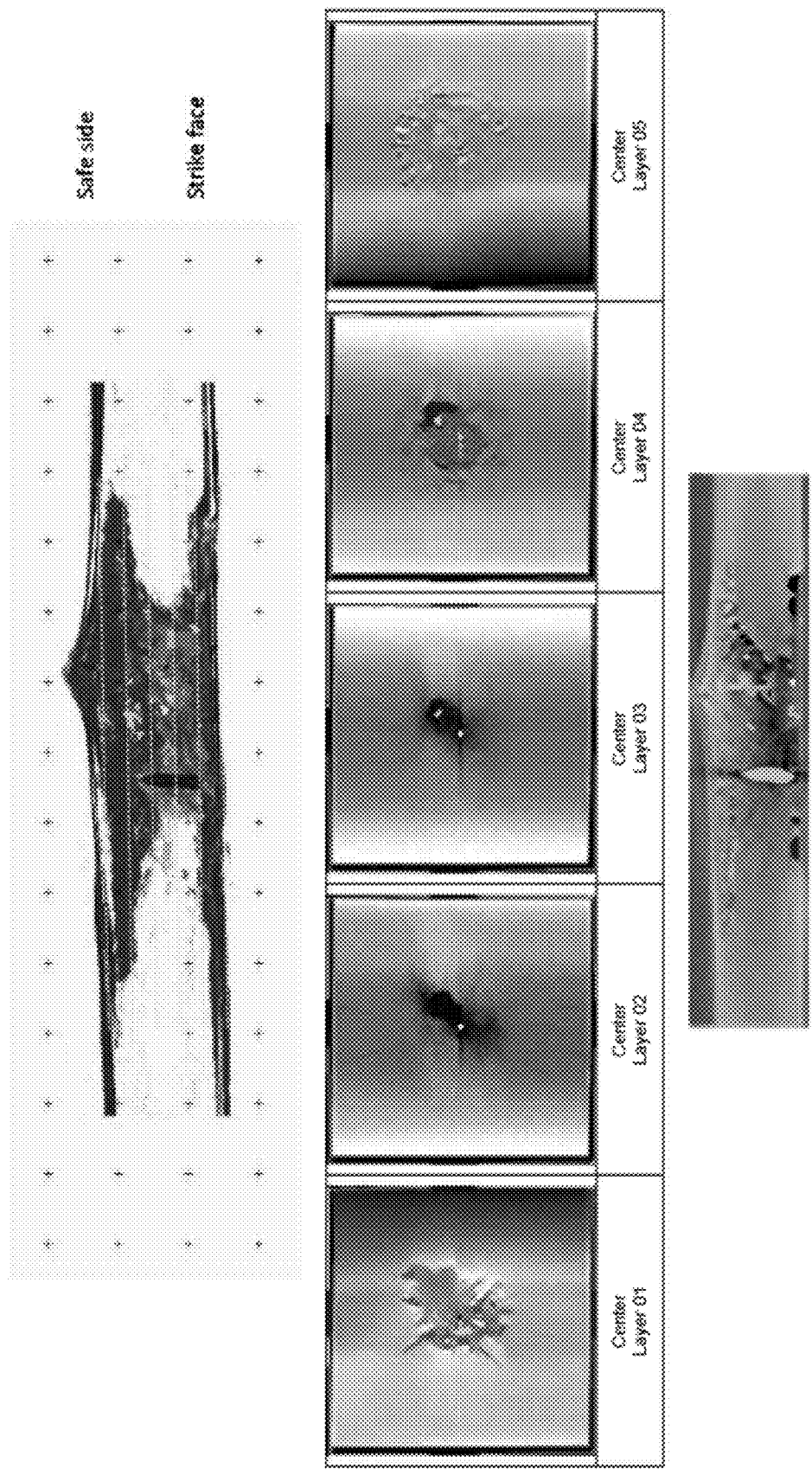
Figure 10:
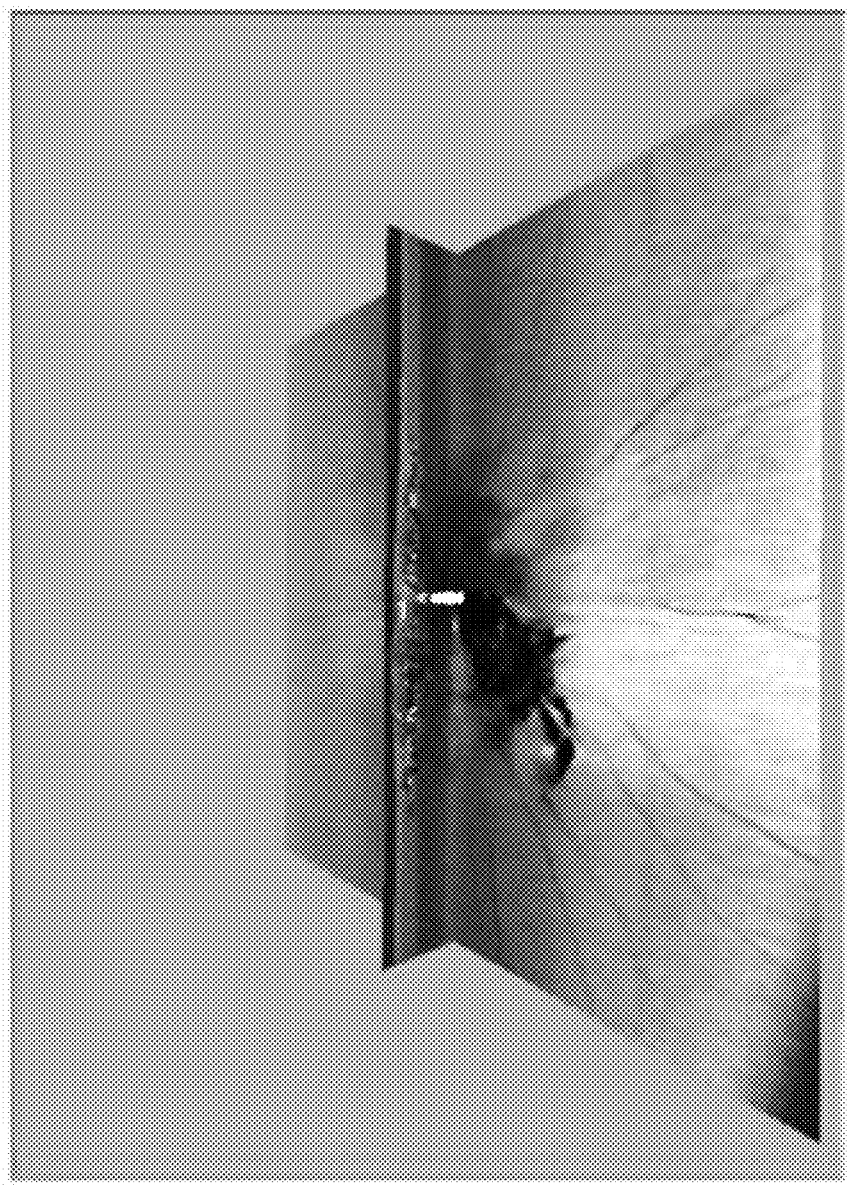
Figure 11:
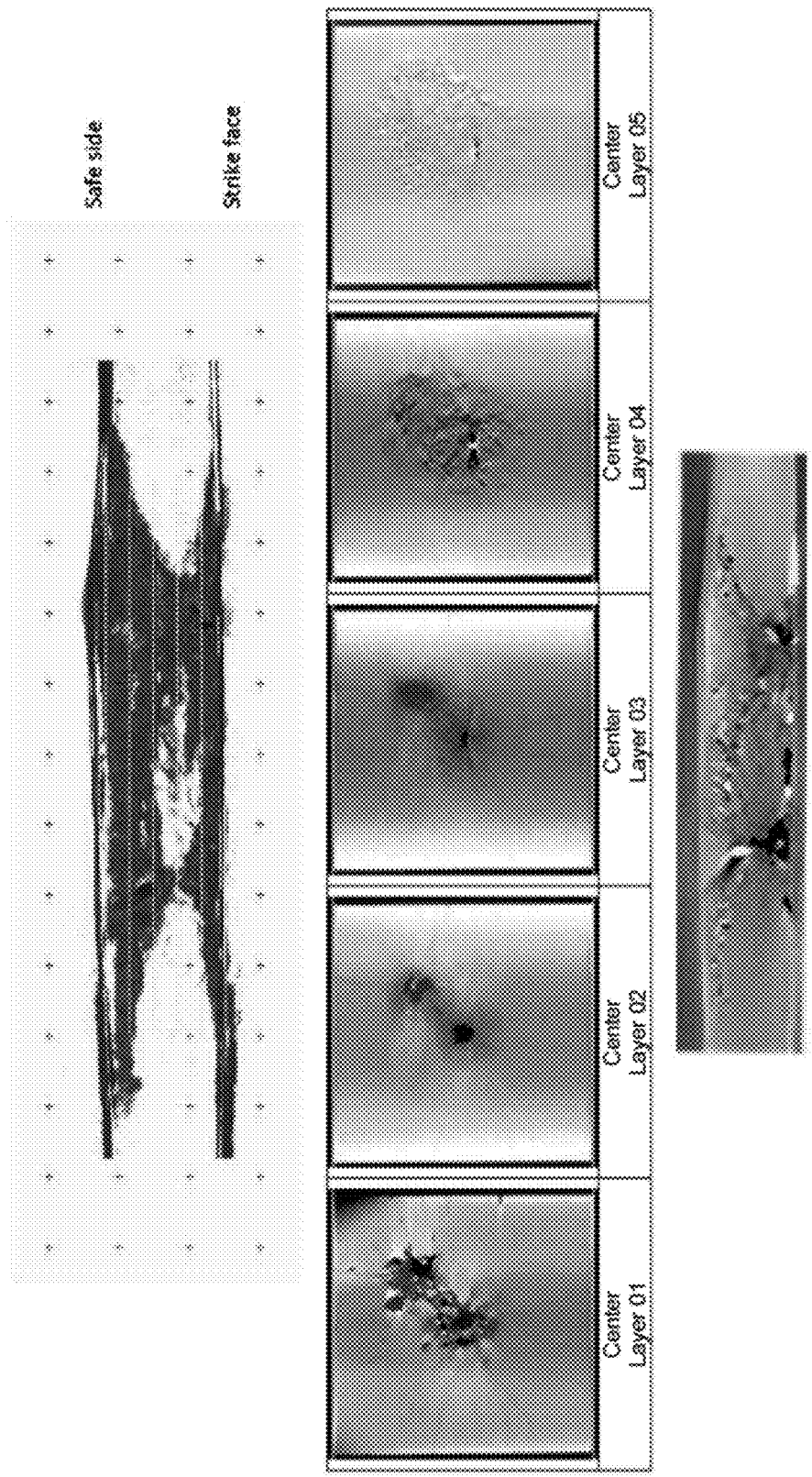
Figure 12:
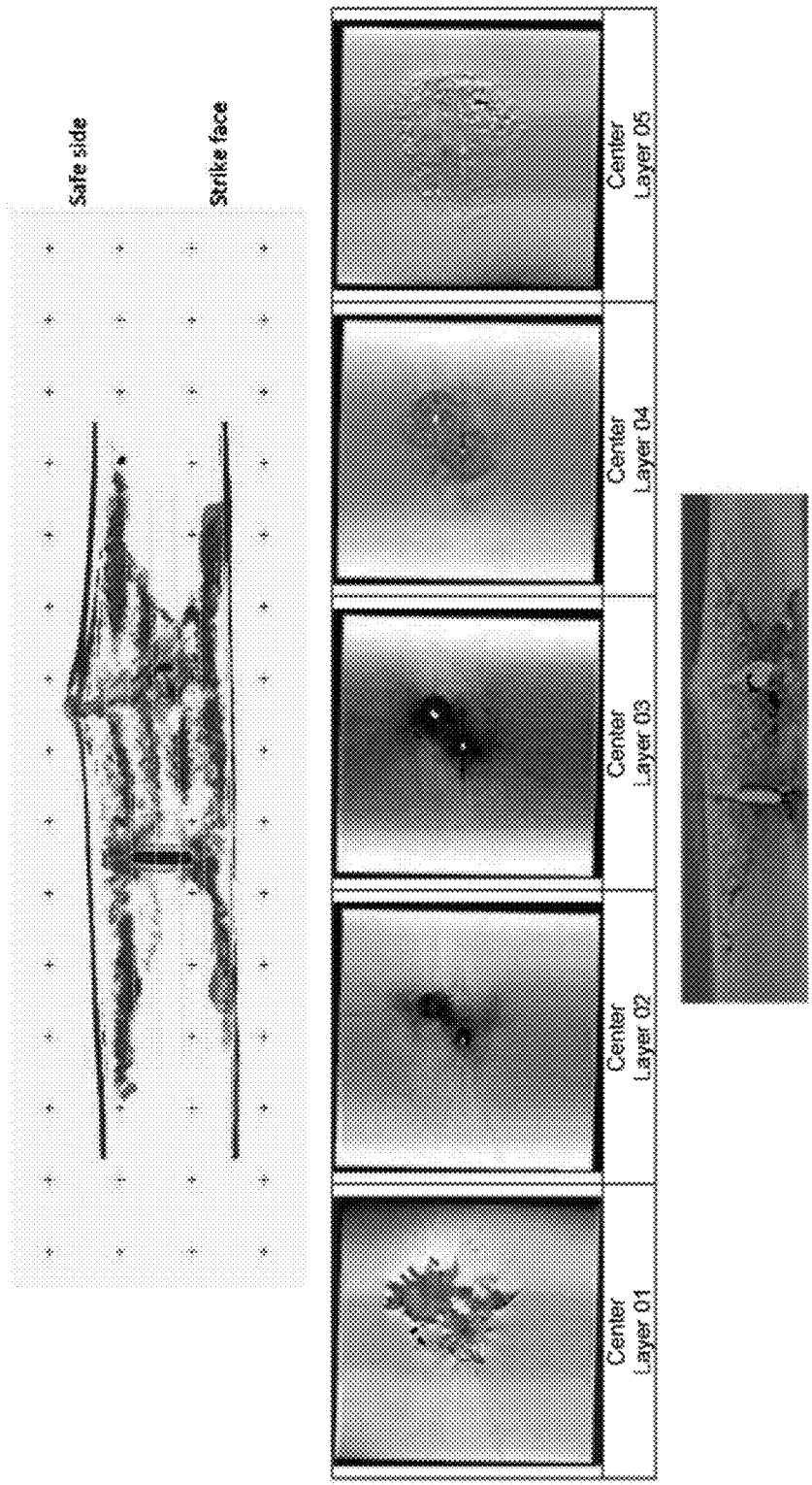
Figure 13:
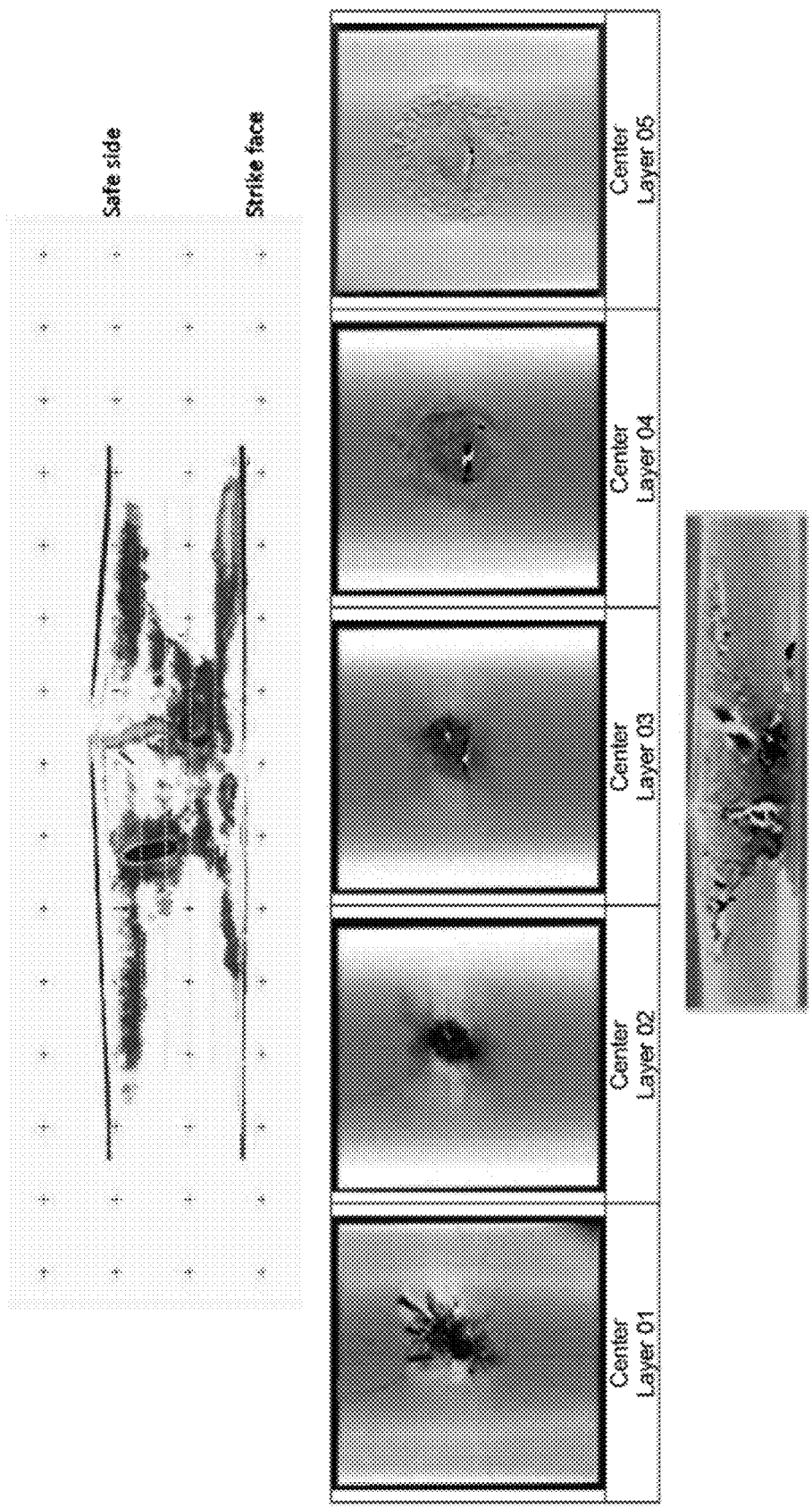
Figure 14:
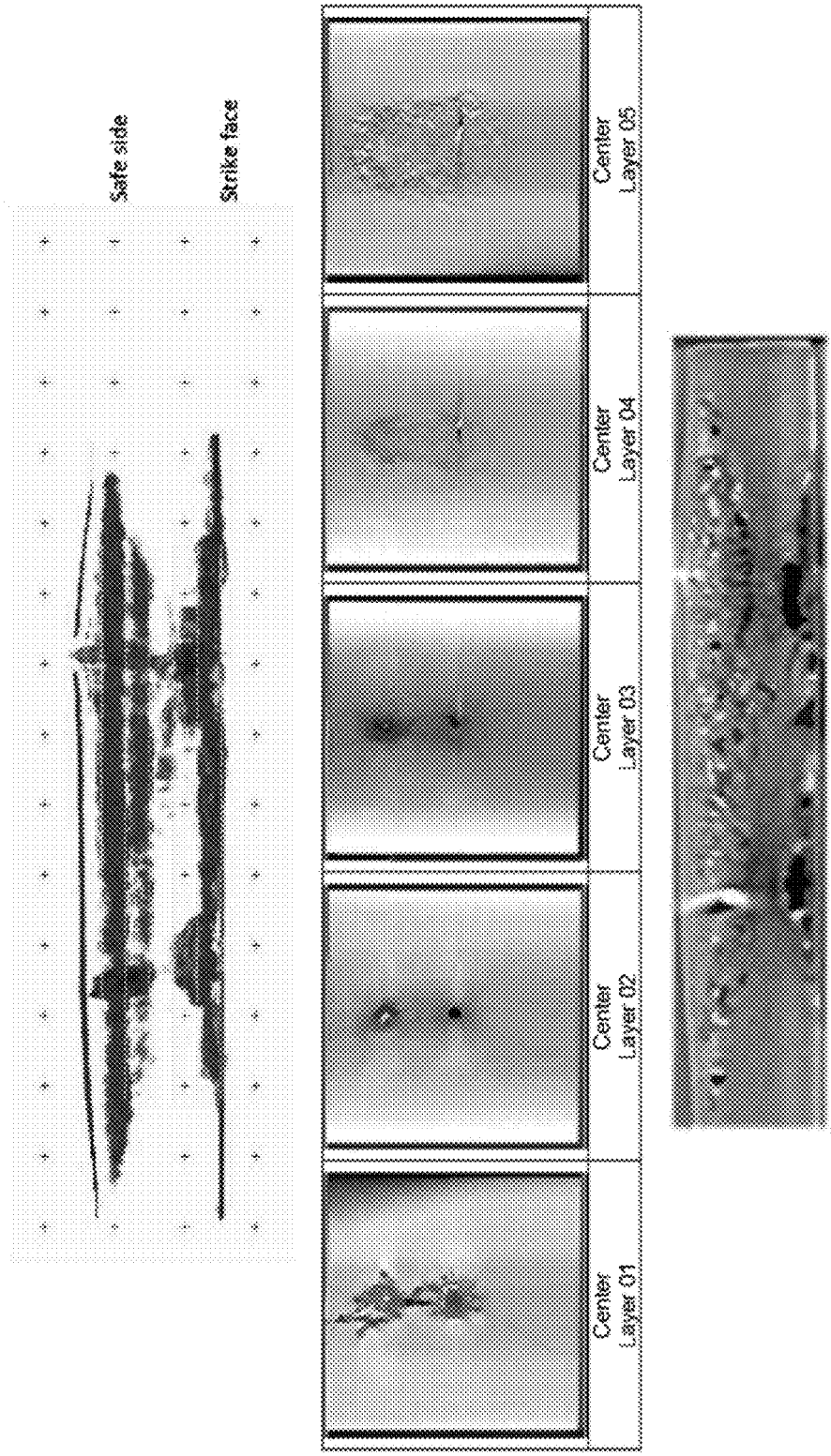
Figure 15:
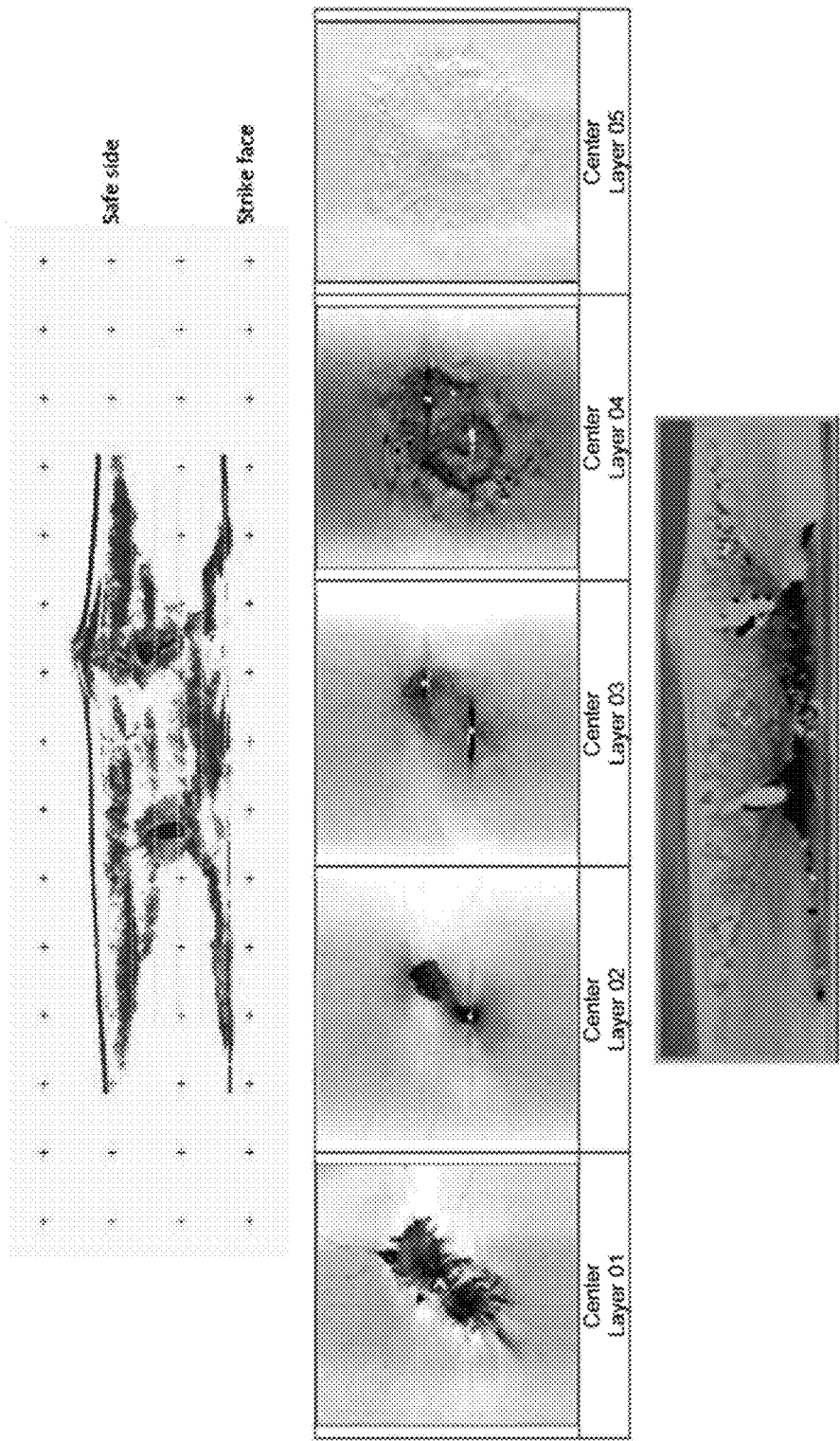
Figure 16:
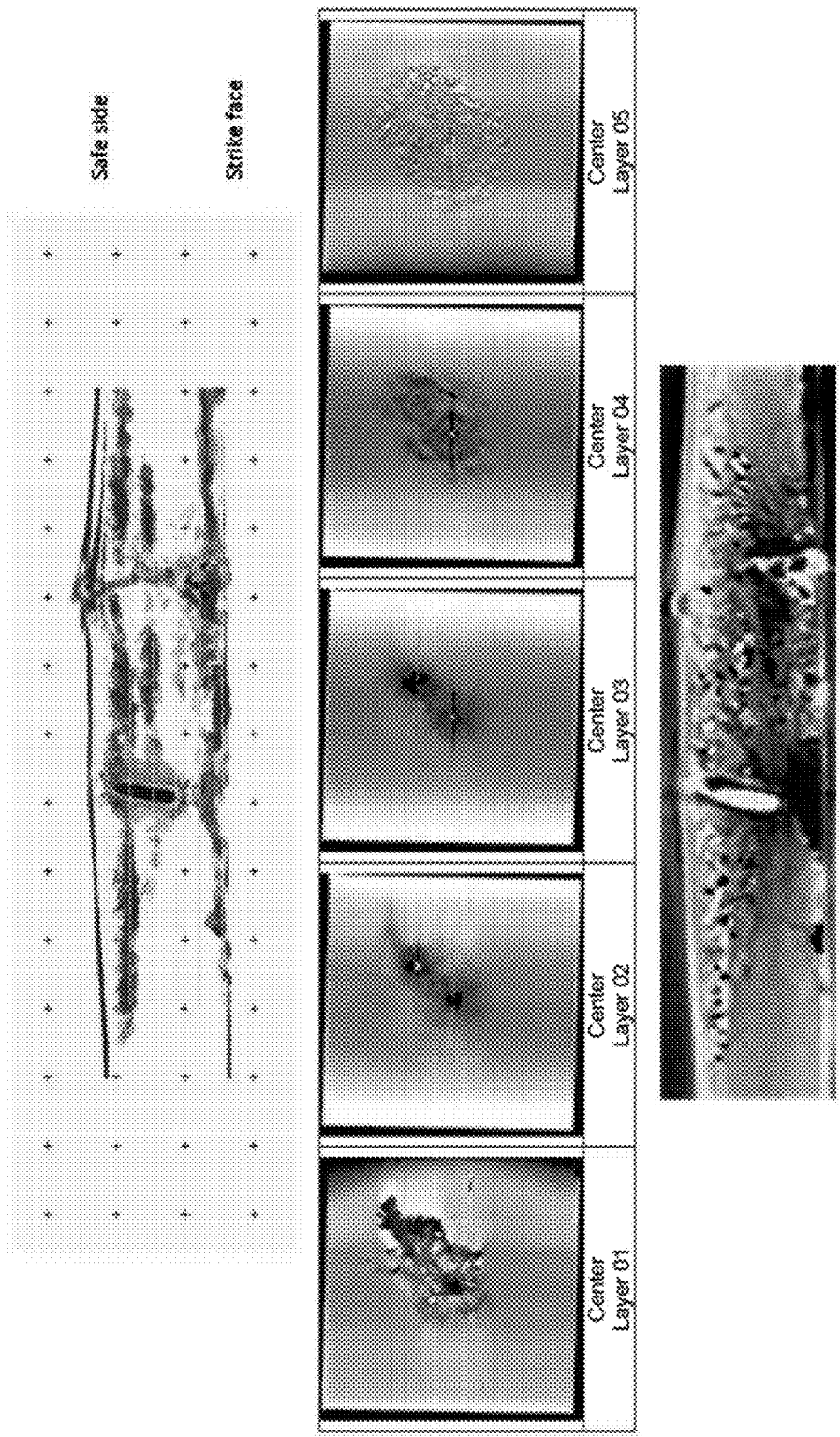
Figure 17:
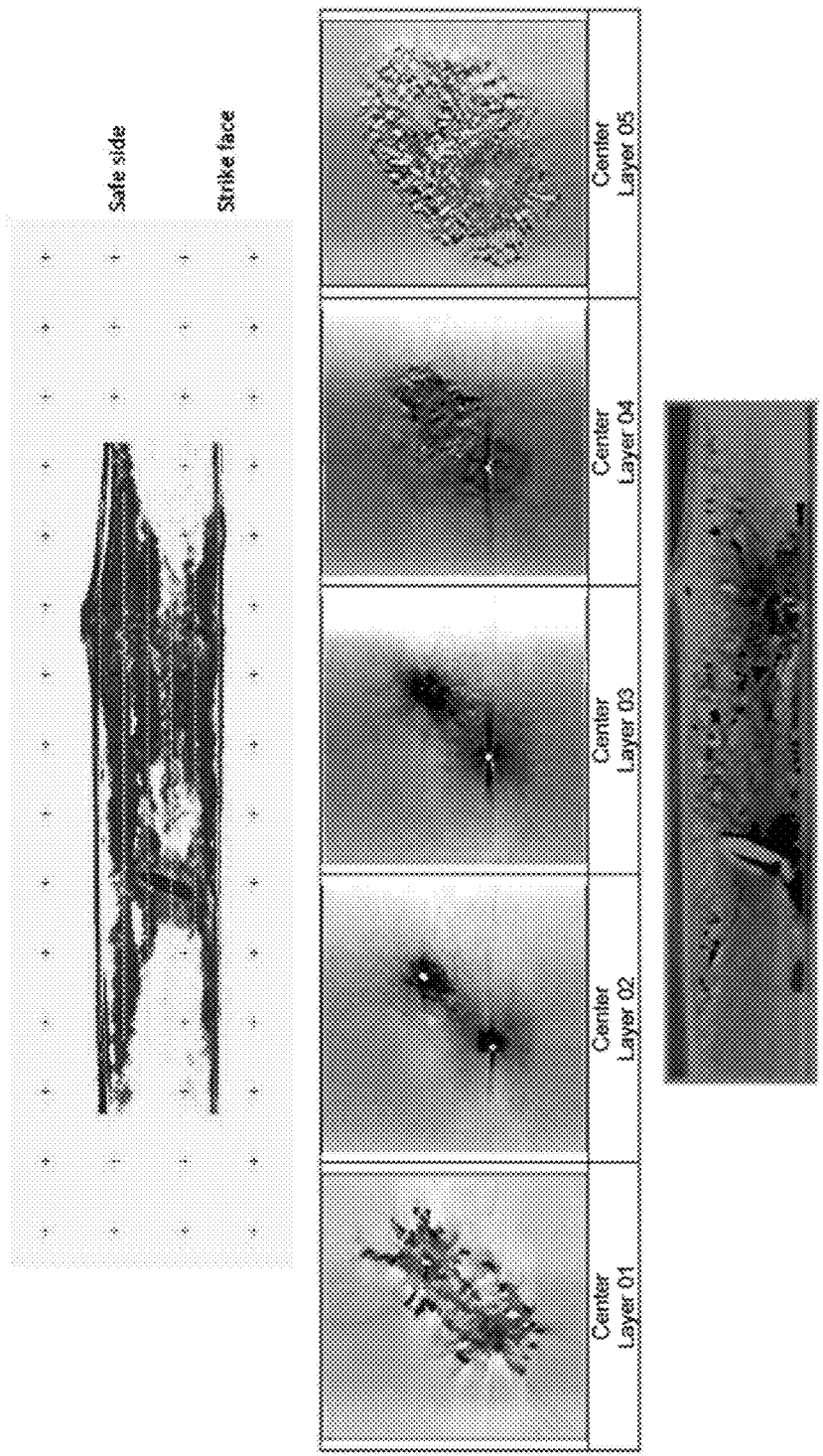
Figure 18:
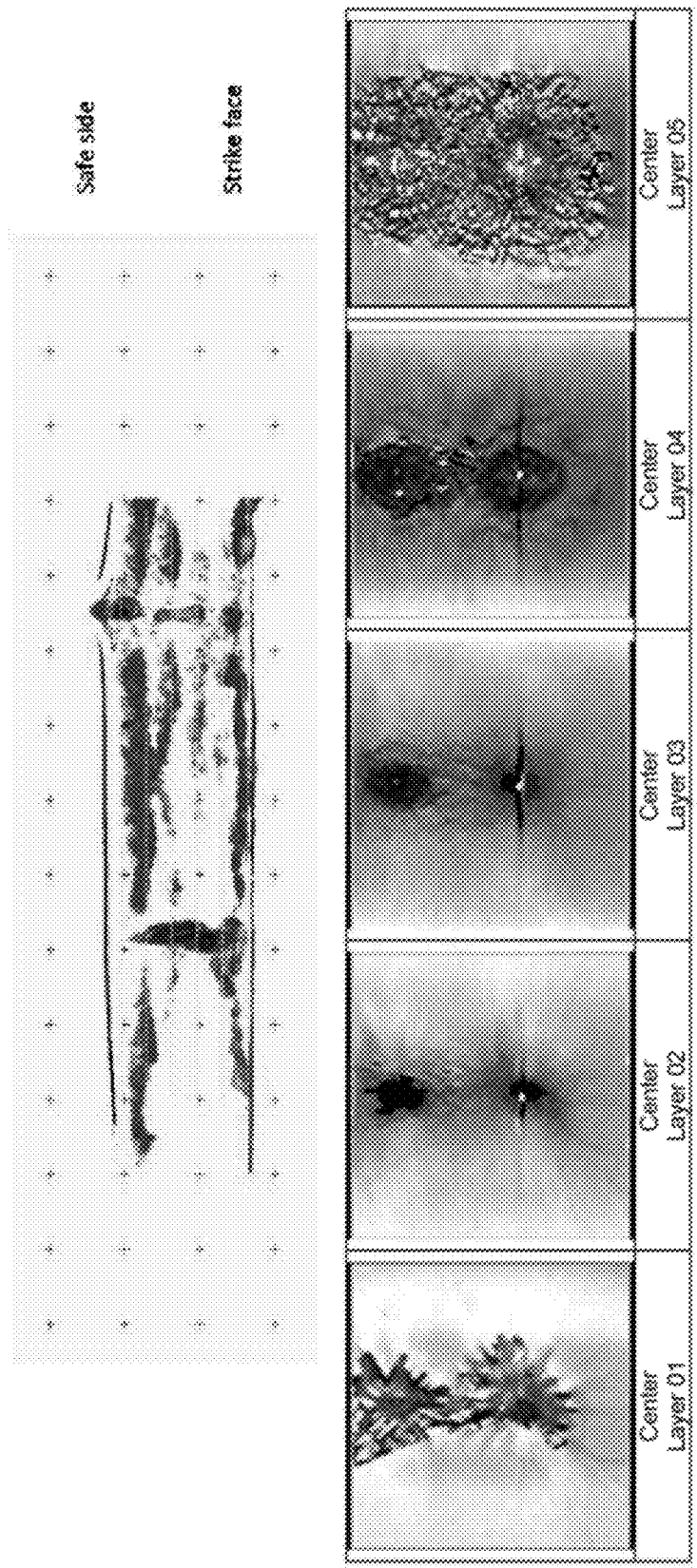

The present disclosure is particularly related to improving the multi-hit capability of armor generally and glass-ceramic armor, in particular. Methods of testing multi-hit capability are commonly known as the "4 shot T" or the "4-shot rectangle" as required by the US DOD Transparent Armor Purchase Description ATPD 2352; the "three shot triangle" or "four shot off-set rectangle" as required in STANAG; 38 mm to 100 mm on center shots as found in US State Department SD-STD-01.01; a 5-shot pattern from NU0108.1, where the specified number of rounds of zero degree obliquity must be defeated in a specified geometry. Examples of some of these testing methods are shown in FIGS. 1 through 3.

It has been determined by the present disclosure that, in prior art laminated armor, there is less turning of a first incoming projectile or round than in subsequent projectiles or rounds. Stated another way, it has been determined by the present disclosure that, when dealing with prior art laminated armor, subsequent projectiles or rounds experience greater turning than initial incoming rounds. Without wishing to be bound by any particular theory, this property is believed by the present disclosure to be caused by the damage to the armor incurred by the impact of the first projectile or round. For instance, in the case of the four shot T, it has been determined that the second and fourth rounds are almost always turned whereas the first and third rounds are seldom turned.

Figure 19:
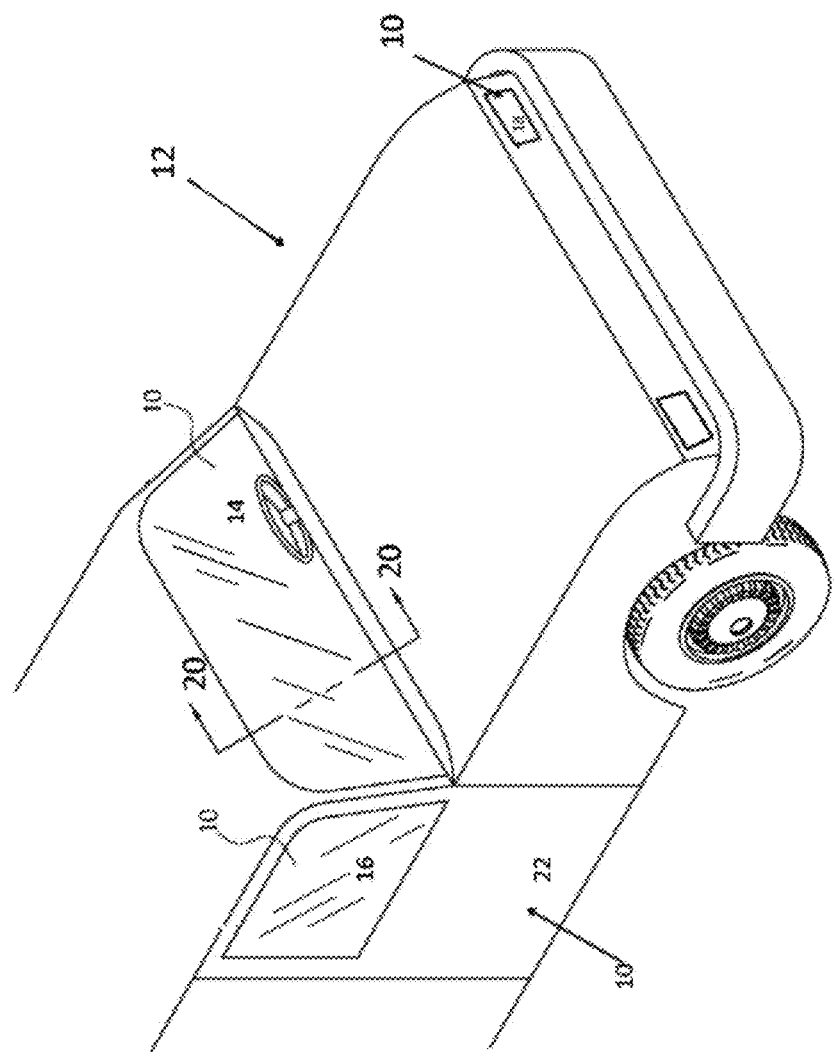
FIG. 19 is a partial perspective view of a vehicle having a windshield, a window, a headlight, or a door fabricated from an exemplary embodiment of a multi-layer armor according to the present disclosure.
Figure 20:
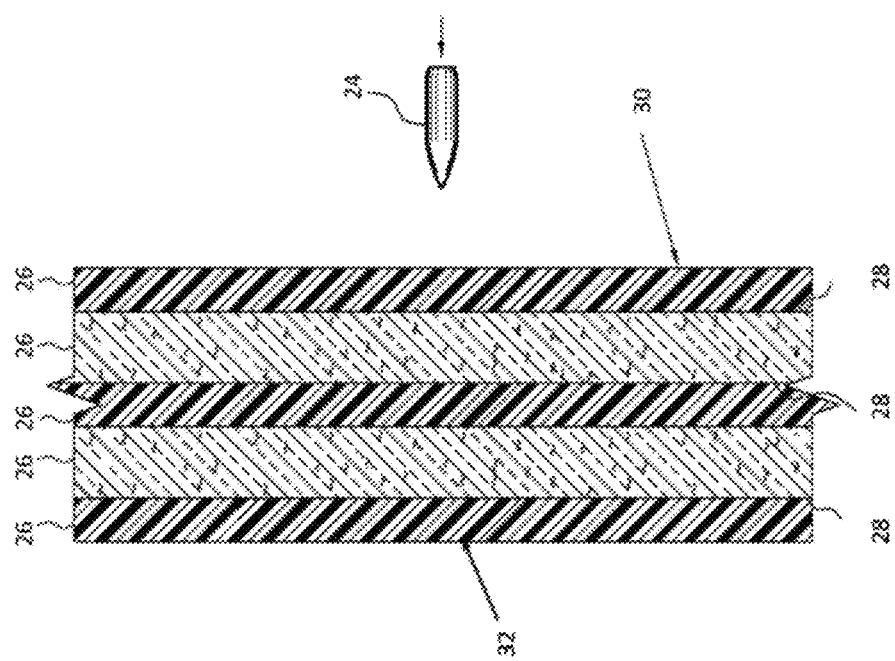
FIG. 20 is a cross-sectional view of the multi-layer armor of FIG. 19 taken along line 20-20.

Advantageously, the present disclosure provides a multi-layer armor 10, shown in FIGS. 19 and 20, that is configured to optimize the ability of damaged armor to turn subsequent projectiles and, in preferred embodiments, to turn the first strike too.

FIG. 19 illustrates multi-layer armor 10 in use with a vehicle 12. Here, armor 10 can be a transparent armor used in one or more locations such as, but not limited to, a windshield 14, a window 16, and a headlight 18. Further, armor 10 can be an opaque or non-transparent, which is used in one or more locations such as, but not limited to, a door panel 22.

It should be recognized that armor 10 is illustrated by way of example only in use with an automobile or truck. Of course, it is contemplated by the present disclosure for armor 10 to find use with any vehicle such as, but not limited to, a car, a boat, a plane, a train, a bus, and others, and to find use with any other object such as, but not limited to, a building window or door or wall, body armor, and others.

While the application of FIG. 19 illustrates armor 10 in a substantially planar shape, it will be understood by one skilled in the art that the armor 10 can have any desired planar or non-planar shape.

Turning now to FIG. 20, armor 10 is illustrated with reference to an incoming projectile 24 traveling along a line of flight. Armor 10 includes a plurality of rigid layers 26 bonded or adhered to one another by interlayers 28. Armor 10 is arranged so that one of the rigid layers 26, known as a strike face 30, faces the incoming projectile 24, while another one of the rigid layers 26, known as a backing plate or spall layer 32 faces a safe side of the armor.

Rigid layers 26 are unitary or integral, one piece layers that can be made of materials such as, but not limited to, glass, ceramics, glass-ceramics, and plastics. The glass and glass-ceramics can include borosilicate, soda lime silicate, alumino silicate, lithium alumino silicate, and any combinations thereof. Without limiting the scope of the present disclosure, suitable glass ceramic materials include those having a crystalline phase of Beta-quartz, spinel, Beta-willemite, forsterite, spinel solid solution, mullite, and similar glass ceramics known in the art.

The plastics suitable for use as rigid layer 26 can include a material such as, but not limited to, transparent polymers such as polycarbonate, polymethyl methacrylate (PMMA), polyurethane, nylon, polyamids, and polyimides, with or without fiber reinforcement. Polymethyl methacrylate (PMMA), or poly (methyl 2-methylpropenoate), is the polymer of methyl methacrylate. The thermoplastic and transparent plastic is sold by the trade names PLEXIGLASS®, PLEXIGLAS-G®, R-CAST®, PERSPEX®, PLAZCRYL®, LI MACRYL®, ACRYLEX®, ACRYLITE®, ACRYLPLAST®, ALTU-GLAS®, POLYCAST® and LUCITE®. It is often also commonly called acrylic glass or simply acrylic. Polycarbonate is sold by the trade names LEXAN® from General Electric, CALIBRE® from Dow Chemicals, MAKROLON® from Bayer and PANLITE® from Teijin Chemical Limited. A suitable transparent polyurethane is sold by BAE systems under the trade name CrystalGuard®. Transparent polyamides are sold by Evonik under the trade name Trogomide®. These transparent polymers may be microcrystalline where the crystallites are so small light passes through, such as Trogomide CX.

Additionally, in opaque applications, armor 10 can also include one or more opaque layers that can form the strike face, the backing plate, or any layer therebetween. These opaque layers can be made of any desired material such as, but not limited to, steel, aluminum, titanium, and any alloys thereof, and fiber reinforced composites for example where the fibers are high strength E-glass, S-glass, or R-glass, or aramids or ultra high mollecular weight polyethelyne (UHM-WPE) or polypropylene reinforcing a polymer matrix being pvb toughened phenolic, or epoxy, or a thermoplastic polyurethane or natural or synthetic rubber. Trade names of light weight fiber reinfroced composites include aramids like Kevlar and Twaron, and UHMWPE such as Dyneema or Spectra.

Turning now to FIGS. 4 through 18, it has also been determined by the present disclosure that damage patterns created in multi-layer armor 10 follows very repeatable patterns, this is particularly true when dealing with rigid layers 26 that are formed of glass, ceramic, and glass-ceramic layers.

FIGS. 4 through 18 illustrate x-ray tomography, in which armor 10 includes five layer glass-ceramic rigid layers 26, bonded with polymer interlayers 28, were tested using one or more armor piercing projectiles 24. Here, the detailed X-ray computed tomography shows .30 caliber armor piercing rounds 24 in single and multiple shots at armor 10 having glass-ceramic rigid layers 26.

The damage patterns in FIGS. 4 through 8 illustrate the damage pattern in each layer of the multilayer glass-ceramic armor 10 after impact by a single armor piercing projectile 24. The damage patterns in FIGS. 9 through 18 illustrate the damage pattern in each layer of the multilayer glass-ceramic armor 10 after impact by more than one armor piercing projectile 24, impacting at various distances from the first shot.

As shown via comparison of the Figures, the amount of damage varies greatly through the thickness of the rigid layers 26 depending on whether the armor 10 was impacted by one or two projectiles 24.

In the center rigid layer 26, the lateral extent of damage is only directly around the projectile 24 approximately 13 millimeters in diameter. In layers 4 and 5, the damage extends laterally, a result of the polymer interlayer 28 pulling the glass-ceramic. Additionally, the turning of the second projectile, as compared to the first projectile 24 is also shown by comparison of FIGS. 4 through 8 to FIGS. 9 through 18.

Shown is one damage pattern in FIGS. 4 through 8 with a single impact, a concodial fracture pattern, which begins in the area of the strike point and radiates outward. Normally, the area of glass or glass-ceramic layer 26 immediately under the strike point impact is turned to powder and tends to leave a void after the impact.

Also shown is a second damage pattern in FIGS. 4 through 8 with a single impact, a radial crack, which starts near the origin and radiates out somewhat uniformly and spreads out towards the perimeter of the layer 26, growing less and less dense with distance from the strike point.

It has been determined by the present disclosure that the ability of multi-layer armor 10 to inducing the turning of subsequent rounds can be greatly influenced by ensuring that the aforementioned repeatable damage patterns are utilized to present conditions to subsequent rounds that induce turning.

For example, it is believed by the present disclosure that the use of polymer interlayers 28 between layers 26, such as glass-ceramic layers, can be used to bond the layers to one another. These interlayers 28 can be configured to hold the rubble formed by the first shot together so that subsequent projectiles are induced to turn when impacting this rubble. The binding force of interlayer 28 is a function of its elastic modulus and thickness such that for a uniform thickness of the interlayer, in the linear elastic regime, the force-extension ratio of the thickness to the elastic modulus is proportional to the strain or extension caused by a unit force. The force-extension ratio is used herein to describe the binding force of interlayer 28 and has a unit of measure of pounds per inch per inch (psi/in).

In prior art armor, the interlayers that have been used have been very stiff with high binding forces, providing a force-extension ratio of about 20,000 psi/in. It has been surprisingly determined by the present disclosure that, in these prior art systems, the fragmented glass formed by the impact of the first projectile are generally held tightly together by the interlayer such that the trajectory of the second shots is only minimally and/or unpredictably affected by the fragmented glass.

Advantageously, armor 10 is configured with interlayer 28 that is much more compliant than previously thought possible, providing a force-extension ratio of 5,600 psi/in or less and, preferably of 2,800 psi/in at the operational temperature of the armor. Without wishing to be bound by any particular theory, it is believed that the more compliant interlayer 28 of the present disclosure allows the fragmented glass to offer consistently lower resistance to subsequent incoming projectiles, which is believed to encourage the projectile to turn in a predictable fashion.

Further, it is believed by the present disclosure that controlling the properties of layers 26 and the interlayers 28 from one spot to another, the character of the fragment clumps or agglomerates can be managed and varied to make the projectile 24 turn.

For purposes of clarity, the term Z axis is used herein to describe the line of fight of the projectile 24 as it approaches an armor target at 0 degrees obliquity, or orthogonal to the planes of the parallel plates and polymers (i.e., layers 26 and interlayers 28) from which the armor 10 is constructed. Similarly, the terms X axis and Y axis describe the plane of the plates orthogonal to the z axis describing the 0 degree obliquity line of flight of the projectile till it impacts the strike face.

Particularly for transparent uses, armor 10 creates variability in the cross section of the planes in the x and y axis by creating patterns of non-uniform properties in the glass or glass-ceramic layers 26 by chemical or thermal tempering of the plates in patterns which will create variability in the physical, mechanical and strength properties of the layers 26.

In the case of glass-ceramics layers 26, these regions may also be introduced by extruding from multiple melt baths each containing a different composition and fusing the regions together during rolling.

Figure 21:
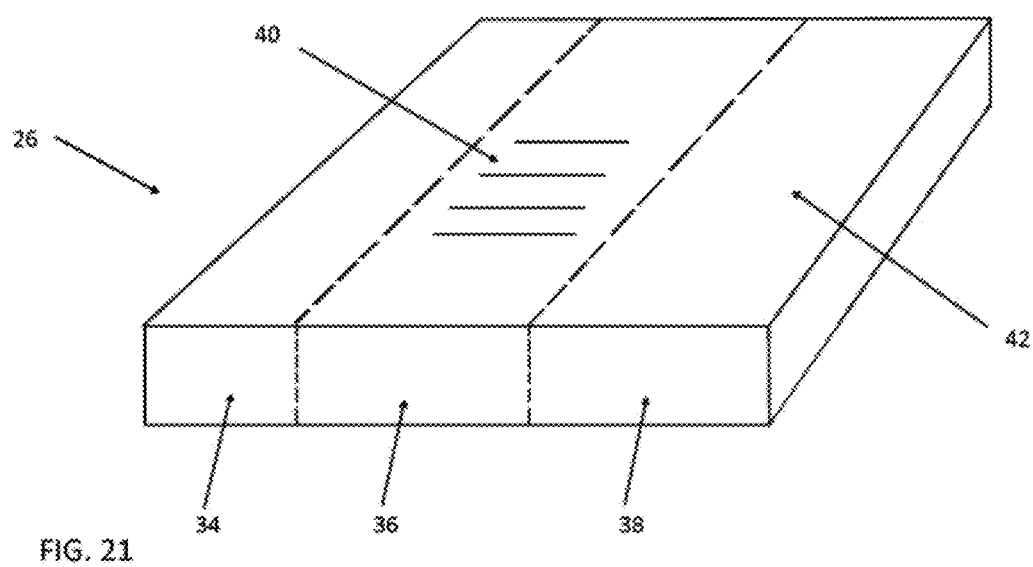
FIG. 21 is a cross-sectional view of an exemplary embodiment of a rigid layer having regions of variable material properties according to the present disclosure.

Referring to FIG. 21, an exemplary embodiment of layer 26 is shown having multiple regions 34, 36, and 38 of varying physical properties.

In some embodiments, the multiple regions 34, 36, and 38 can be formed by providing one or more patterns 40 formed in or on the surface of layer 26. Armor 10 is assembled so that patterns 40 are offset from one another on subsequent layers such that the condition of the layer 26 the projectile 24 is likely to encounter in a target constructed of multiple plates will be variable plate to plate. Pattern 40 can have any desired geometry or design such as circles, triangles, squares, rectangles, lines, squiggles, dots, and any combinations thereof are contemplated.

Pattern 40 can be formed in layer 26 in any desired manner such as, but not limited to, chemical etching or physical etching or via rolling during formation of the layer. Pattern 40 can also be formed on the surface of layer 26 in any desired manner such as, but not limited to, printing or rolling a material onto the surface of layer. When formed in layer 26, pattern 40 can have variable depth. Similarly, when formed on the surface of layer 26, pattern 40 can be formed with variable height. When bonding the layers 26 and interlayers 28 to form armor 10, the interlayer can flow into and fill pattern 40.

In some embodiments, one or more of layers 26 can be formed of rigid polymer. In these embodiments, the rigid polymer layer 26 can have with regions of varying properties using pattern 40. For instance, when layer 26 is a polycarbonate or PMMA plate, the layer can include pattern 40 that is can be machined or etched on its surface to provide cavities of varying depth and/or width, or can be punched or drilled with holes of varying diameter. Pattern 40 is then filled with a second material that has an index of refraction substantially equal to that of layer 26. Preferably, pattern 40 is oriented at 8 degrees or more from any viewing angle to avoid internal reflections blocking visibility. The second material within pattern 40 can be harder than or softer than the remaining portions of layer 26.

In other embodiments, each layer 26 can be tempered to different degrees in a desired pattern within the layer to form areas 34, 36, 38 discussed above. Additionally, each layer 26 within armor 10 can be tempered to different degrees plate by plate to provide differing material properties along the z axis.

In the case of chemical tempering, the areas 34, 36, 38 can be created by screen printing, transfer printing or similar means of applying the pattern mask for chemical tempering.

For example, it is contemplated for layer 26 to be tempered so that areas 34, 36, 38 of varying temper form strips 42 as shown in FIG. 21. During assembly, layers 26 are stacked on one another so that the strips 42 in the various layers are angled with respect to one another.

In the case of thermal tempering, the tempering can also be performed to various degrees in alternating patterns through the stack, such that each layer will offer a variable resistance to the incoming round, creating a bias in the flight to bring it to a turning motion from the z axis.

In some embodiments, layer 26 can be formed with areas 34, 36, 38 of dissimilar material properties by forming various shaped materials into the layer. For example, layer 26 can be formed from a glass-ceramic sphere, which is then pressed into a flat sheet of low Tg glassy material. With matching refractive indexes, such a construction would remain transparent, while having significant material variability within the armor 10.

Thus, armor 10 can be configured using layers 26 that have varying physical properties within the layer, between the different layers, and any combinations thereof in a manner that promotes the turning of the projectile 24.

Armor 10 can also use interlayers 28 of varying physical properties in a manner that promotes the turning of the projectile 24. For example, interlayer 28 can have varying physical properties within the interlayer, between the different interlayers, and any combinations thereof. The interlayer 28 can be transparent or opaque and can be formed of any desired transparent adhesive such as, but not limited to aliphatic polyether polyurethanes or poly(vinyl butyral)s, ethylene/methacrylic acid copolymer, silicone, epoxy, and any combinations thereof.

Other suitable transparent polymer interlayers 28 include transparent thermoplastics or thermosets such as acrylonitrile-butadiene-styrene (ABS), acetal resins, cellulose acetate, cellulose acetate butyrate, cellulose acetate propionate, cellulose tri-acetate, acrylics and modified acrylics, allyl resins, chlorinated polyethers, ethyl cellulose, epoxy, fluoroplastics, ionomers (like Dupont Surlyn A), melamines, nylons, parylene polymers, transparent phenolics, phenoxy resins, polybutylene, polycarbonates, polyesters, polyethylenes, polyphenylenes, polypropylenes, polystyrenes, polyurethanes, polysolphones, polyvinyl-acetate, polyvinyl butyral, silicones, as well as styrene-acrylonitride and styrene-butadiene copolymers.

It has been determined by the present disclosure that varying properties in the interlayers 28 can also affect the distribution of fragments formed by the first strike. As discussed above, regions of the interlayer 28 with higher stiffness will clamp the fragments more tightly together than regions with lower stiffness.

Figure 22:
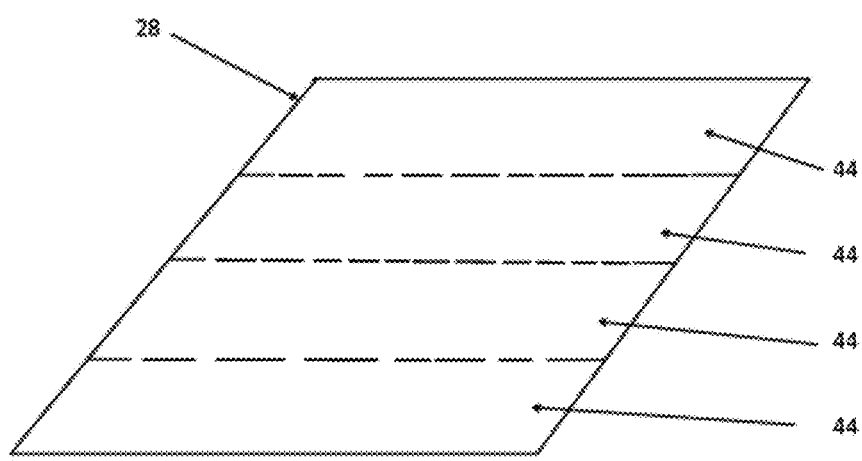
FIG. 22 is a cross-sectional view of an exemplary embodiment of an interlayer having regions of variable material properties according to the present disclosure.

An exemplary interlayer 28, having regions 44 of variable properties, is shown in FIG. 22. Interlayer 28 is can be formed by using for example, side-by-side co-extrusion to form regions 44 of varying properties. Interlayer 28 formed in this manner can be used as a single ply, or in laminate of multiple plys with each ply being laid on top of one another so that the regions 44 of the laminate are have angular orientations with respect to one another such as 0/90 degree, 0/45/45, 0/60/60 etc.

Of course, it is contemplated by the present disclosure for interlayer 28 to have discrete regions 44 such as squares, circles, triangles, etc. that can be made by point-by-point extrusion into a sheet of thermoplastic or thermal set adhesive.

Experimental Results

Three samples of target armor 10 were made and tested against the .30 caliber AP M2 at an impact velocity of 2850 feet per second (fps). The three samples of target armor 1—were designed to allow the projectile to penetrate. All three samples were constructed having eight layers 26 and six interlayers 28 and were bonded using a known vacuum bag and autoclave process.

The construction of the layers and interlayers of each of the three series of targets is seen in Table 1.

|  | Sample #1 | Sample #2 | Sample #3 |
| --- | --- | --- | --- |
| Layer 1 | 6.5 millimeters (mm) of borosilicate glass | — | — |
| Interlayer | 0.1 inches of thermoplastic polyurethane (TPU) | — | 0.1 inches TPU having side-by-side discontinuities |
| Layer 2 | 0.125 inches of polycarbonate | 0.125 inches of perforated and urethane filled polycarbonate | — |
| Interlayer | 0.1 inches of TPU | — | 0.1 inches TPU having side-by-side discontinuities |
| Layer 3 | 6.5 mm of borosilicate glass | — | — |
| Interlayer | 0.1 inches of TPU | — | 0.1 inches TPU having side-by-side discontinuities |
| Layer 4 | 9 mm of borosilicate glass | — | — |
| Interlayer | 0.1 inches of TPU | — | 0.1 inches TPU having side-by-side discontinuities |
| Layer 5 | 6.5 mm of borofloat | — | — |
| Interlayer | 0.1 inches of TPU | — | 0.1 inches TPU having side-by-side discontinuities |
| Layer 6 | 0.125 inches polycarbonate | 0.125 inches of perforated and urethane filled polycarbonate | — |
| Interlayer | 0.1 inches of TPU | — | 0.1 inches TPU having side-by-side discontinuities |

-continued

|  | Sample #1 | Sample #2 | Sample #3 |
|---|---|---|---|
| Layer 7 | 0.125 inches polycarbonate | 0.125 inches of perforated and urethane filled polycarbonate | — |
| Interlayer | 0.1 inches TPU | — | 0.1 inches TPU having side-by-side discontinuities |
| Layer 8 | 0.063 inches of polycarbonate | — | — |

In the second sample, the three layers 26 of 0.125 inch polycarbonate from the first sample were replaced with layers 26 having pattern 40 perforated therethrough and filled with a transparent urethane having a density 10% less than polycarbonate and having a shore A hardness of 95 whereas polycarbonate is much harder at Rockwell M70. The urethane filler has a tensile strength of 28 MPa whereas the unperforated polycarbonate layer has a tensile strength of 55-75 MPa.

In the third sample, the 0.1 inch TPU interlayers layers from the first sample were replaced with interlayers having side-by-side property discontinuities on the order of 0.3" scale where one TPU had a Shore A hardness of 70 and the other a shore A hardness of 95 and an attendant difference in elastic modulus. Densities of the side-by-side areas were similar.

The track of the projectile exiting each of the three samples was determined by determining an angle of obliquity with which the projectile exiting the sample would impact a residual block. After the projectile was allowed to pass through the sample, a transparent residual block of polycarbonate was positioned one and a half inches behind the back of the test target. Then, a probe was inserted into the test target and aligned with the path through the tested sample. Finally, the angle that the probe made with the face of the polycarbonate residual block was measured using a protractor.

Each sample was impacted two times; the first shot was placed in the center of the sample and the second shot was placed into a damage region where the first layer of glass was still full thickness but the glass was badly cracked with radial, circumferential and transverse cracks making it opaque. The placement of the second shot was varied between 42.5 mm and 50.5 mm away from the first shot.

The results are shown in Table 2.

| Sample | Target AD (psf) | Target Thickness (in) | Shot 1 exit obliquity (deg) | Shot 2 exit obliquity (deg) |
|---|---|---|---|---|
| 1 | 19.4 | 2.25 | 0-3 | 30-43 |
| 2 | 19.5 | 2.27 | 2-8 | 43-50 |
| 3 | 19.3 | 2.20 | 15-30 | 50-58 |

It can be seen from Table 1 that the interlayers 28 in all three of the sample targets were all 0.1" thick, providing the desired force-extension ratio of 2,800 psi/in. Further, it can be seen from Table 2 that 100% the second shots turned with significant and relatively consistent exit obliquities.

The results presented in Table 2 also show an increase in the obliquity of the projectile of the second shot for both cases of side-by-side discontinuities (samples 2 and 3) as compared to sample 1, which lacks the side-by-side discontinuity. The effect on the first shot is surprisingly effective with the discontinuity in the interlayer 28, showing the importance of the interaction with the glass in turning a first shot; indicating that side-by-side discontinuities in the glass layers would also provide noticeable turning of the first shot projectile.

In some of the examples discussed above, the side-by-side discontinuity is in the layer 26 and/or interlayer 28, namely in the plane defined by the x and y axes. In some embodiments of the present disclosure, armor 10 is configured to provide discontinuity between material properties along the direction of flight.

For example, it is contemplated by the present disclosure for strike face 30 and/or one or more layers 26 proximate to the strike face to have a strength that is 3 or more times higher than the strength of the remaining layers 26. In some embodiments, strike face 30 and layer 26 immediately adjacent to the strike face are 3 or more times stronger, and preferably 5 or more times stronger, than the layers 26 in the rest of armor 10.

As used herein, the term "strength" means resistance to failure in flexural bending and especially bi-axial bending such as induced by ring on ring testing where the results are less sensitive to edge effects as compared to modulus of rupture values based on three or four point bending.

Nine samples of target armor 10 were made with the strike face layer 30 and the layer 26 immediately adjacent thereto made of high strength glass having a characteristic strength approximately 5 times greater than the sublevel glass-ceramic layers 26 and approximately 8 times stronger than the sublevel plastic layers 26. In the multi-hit shots all of the projectiles stopped approximately 64% of the way through the target whereas in prior art armor of a similar number of layers 26 and interlayers 28 having with the first and second layer of the same strength as the sub-level layers, 33% of the multi-hit shots penetrated through 79% or more of the target thickness to the point where they could be seen through the transparent polycarbonate on the safe side.

An added advantage, armor 10 having high strength strike face 30 also provide increased resistance to scratching or chipping from small objects that may impact the transparent armor in use, or get dragged over the windows during use.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the present disclosure.

What is claimed is:

1. A multilayer armor comprising:
a first rigid layer;
a second rigid layer; and
an interlayer securing the first and second rigid layers to one another, wherein at least one of the first and second rigid layers is divided into strips having varying degrees of tempering.

2. The multilayer armor of claim 1, wherein the first and second rigid layers and the interlayer are each transparent and have matching refractive indicies such that the armor is transparent.

3. The multilayer armor of claim 1, wherein each of the first and second rigid layers comprises a physical or material property that varies within the layer.

4. The multilayer armor of claim 1, wherein the first and second rigid layers are made of a material selected from the group consisting of glass, ceramic, glass-ceramic, and plastic.

5. The multilayer armor of claim 1, wherein said tempering is chemical or thermal tempering.

6. The multilayer armor of claim 1, wherein each of the first and second rigid layers is divided into strips having varying degrees of tempering, and the strips in the first rigid layer and the strips in the second rigid layer are angled with respect to one another.

7. The multilayer armor of claim 1, wherein the at least one of the first and second rigid layers is a rigid polymer layer having cavities defined therein, and the rigid polymer layer includes a different material within the cavities, wherein the different material has an index of refraction substantially equal to that of the rigid polymer layer.

8. The multilayer armor of claim 1, wherein the at least one of the first and second rigid layers comprises a glass-ceramic sphere that is flattened.

9. The multilayer armor of claim 1,
wherein said first rigid layer is a glass or glass-ceramic layer comprising a strike face,
wherein the strike face has a strength that is at least three times greater than the strength of the second rigid layer.

10. The multilayer armor of claim 1, wherein said interlayer has a physical or material property that varies within the interlayer.

11. The multilayer armor of claim 1, wherein said interlayer has a force-extension ratio of 5,600 psi/in or less.

* * * * *